US012261321B2

(12) United States Patent
Bucur

(10) Patent No.: US 12,261,321 B2
(45) Date of Patent: Mar. 25, 2025

(54) SOLID-STATE POLYMER SEPARATOR FOR LITHIUM-ION BATTERIES

(71) Applicant: Piersica Inc., Sunrise, FL (US)

(72) Inventor: Claudiu B. Bucur, Sunrise, FL (US)

(73) Assignee: Piersica Inc., Sunrise, FL (US)

( * ) Notice: Subject to any disclaimer, the term of this patent is extended or adjusted under 35 U.S.C. 154(b) by 327 days.

(21) Appl. No.: 17/243,980

(22) Filed: Apr. 29, 2021

(65) Prior Publication Data

US 2021/0344079 A1 Nov. 4, 2021

Related U.S. Application Data

(60) Provisional application No. 63/018,178, filed on Apr. 30, 2020.

(51) Int. Cl.
*H01M 50/411* (2021.01)
*H01M 10/0525* (2010.01)
*H01M 10/0565* (2010.01)
*H01M 50/44* (2021.01)

(52) U.S. Cl.
CPC ..... *H01M 50/411* (2021.01); *H01M 10/0525* (2013.01); *H01M 10/0565* (2013.01); *H01M 50/44* (2021.01)

(58) Field of Classification Search
CPC .............................. H01M 50/411; H01M 50/44
See application file for complete search history.

(56) References Cited

U.S. PATENT DOCUMENTS

| | | | |
|---|---|---|---|
| 3,989,540 A | 11/1976 | Feuillade et al. | |
| 5,962,162 A | 10/1999 | Barrella et al. | |
| 7,279,251 B1 | 10/2007 | Yun et al. | |
| 7,642,012 B2 | 1/2010 | Djian et al. | |
| 7,794,511 B2 | 9/2010 | Wensley et al. | |
| (Continued) | | | |

FOREIGN PATENT DOCUMENTS

| | | |
|---|---|---|
| CN | 104939723 A | 9/2015 |
| CN | 110518282 A | 11/2019 |
| WO | 2019/133822 A2 | 7/2019 |

OTHER PUBLICATIONS

International Search Report and Written Opinion dated Aug. 13, 2021 for corresponding International Application No. PCT/US2021/029833.

*Primary Examiner* — Nathanael T Zemui

(74) *Attorney, Agent, or Firm* — Richard C. Piercy, Esq.; Grell & Watson Patent Attorneys LLC

(57) ABSTRACT

A safe, thin and highly conductive solid-state polymer separator for lithium-ion batteries. The separator may be deployed in a battery which lacks solvent and allows lithium ions to pass through channels via the polymerized structure. The lithium conductive polymers may be formed through free radical polymerization and may comprise a lithium conductive polymer having a polymerized carbonate solvent between iterative spacers, a lithium conductive material, and a reinforcing additive. Optionally, an interface coating may reside on one or more sides of the separator to ensure long-term operation. By utilizing such a separator in a solid-state lithium battery, cell assembly may be simplified, shrinkage may be decreased and safety may be increased. Various methods of manufacturing the solid-state polymer separator for lithium-ion batteries are disclosed.

17 Claims, 4 Drawing Sheets

(56) References Cited

U.S. PATENT DOCUMENTS

| | | |
|---|---|---|
| 8,372,745 B2 | 2/2013 | Koike |
| 8,389,587 B2 | 3/2013 | Pan et al. |
| 9,331,323 B2 | 5/2016 | Huang |
| 10,158,109 B2 | 12/2018 | Eitouni et al. |
| 2012/0208070 A1 | 8/2012 | Nakashima et al. |
| 2013/0078526 A1 | 3/2013 | Kojima et al. |
| 2016/0028114 A1* | 1/2016 | Pratt .................... H01M 4/621 |
| | | 429/309 |
| 2016/0308243 A1 | 10/2016 | Herle et al. |
| 2016/0365556 A1* | 12/2016 | Liu .................... H01M 50/417 |
| 2018/0026302 A1 | 1/2018 | Kumar et al. |
| 2018/0083307 A1* | 3/2018 | Makino ............... H01M 10/056 |
| 2018/0358597 A1 | 12/2018 | Liao et al. |
| 2019/0181496 A1 | 6/2019 | Visco et al. |
| 2019/0245182 A1 | 8/2019 | Liao et al. |
| 2019/0372149 A1* | 12/2019 | Cho .................... H01M 50/443 |
| 2020/0112050 A1 | 4/2020 | Hu et al. |
| 2022/0140389 A1* | 5/2022 | Liu .................... H01M 10/056 |
| | | 429/492 |

\* cited by examiner

SOLID-STATE POLYMER SEPARATOR FOR LITHIUM-ION BATTERIES

CROSS-REFERENCE TO RELATED APPLICATIONS

To the full extent permitted by law, the present United States Non-Provisional Patent Application hereby claims priority to and the full benefit of, United States Provisional Application entitled "SAFE, THIN, HIGHLY CONDUCTIVE SOLID-STATE POLYMER SEPARATOR FOR LITHIUM ION BATTERIES," having assigned Ser. No. 63/018,178, filed on Apr. 30, 2020, which is incorporated herein by reference in its entirety.

BACKGROUND OF THE DISCLOSURE

Technical Field of the Disclosure

The instant disclosure relates to chemistry, namely electrical current producing apparatuses. More particularly, the instant disclosure relates to the manufacture of battery components having certain improvements to the manufacture of an separator in order to increase performance, safety, and conductivity of the overall battery.

Description of the Related Art

A lithium-ion battery, or Li-ion battery, is a type of rechargeable battery commonly used in portable electronics and electric vehicles. Compared with previous battery technologies, lithium-ion batteries offer faster charging, larger capacity, and higher power density which allows for greater performance in a smaller and lighter package. While there are a large number of reasons that lithium has become a favorable element in battery technology, the most important reasons have to do with its elemental structure. Lithium is highly reactive because it readily loses its outermost electron, allowing current to easily flow through a battery. As the lightest metal, lithium is much lighter than the other metals commonly used in batteries (e.g., lead). This property is important for small objects such as phones but also for cars that require many batteries. Finally, lithium-ions and electrons move easily back into positive electrodes (cathodes), allowing for numerous recharging cycles. Innovation in lithium-ion battery technology has helped to minimize the form factor of electronic devices while simultaneously increasing their capabilities. Smart phones, smart watches, wearable devices, and other modern electronic luxuries simply would not be possible without some of the lithium-ion battery advances witnessed in recent decades.

Conventional lithium-ion batteries use a liquid electrolyte. The liquid electrolytic solution in a liquid electrolyte lithium-ion battery is used to regulate the current flow during charging and discharging. Current "flows" through the liquid electrolytic solution between the anode and cathode in order to allow a battery user to store and then use the electrical energy stored with the battery. More specifically, lithium-ions move from the negative electrode (the anode) through an electrolyte to the positive electrode (the cathode) during discharge, and back when charging. These lithium-ion batteries usually use an intercalated lithium compound as the material at the cathode and graphite at the anode. Graphite in its fully lithiated state of $LiC_6$ correlates to a maximal capacity of 372 mAh/g.

While liquid lithium-ion batteries have a high energy density, no memory effect, and low self-discharge, they can be a safety hazard since they contain flammable electrolytes. If damaged and exposed to air or incorrectly charged, these batteries can lead to or even cause explosions and fires. Removable lithium-ion battery recalls due to fire hazard are common and costly, and several portable electronics manufacturers have even been forced to recall expensive electronic devices without removable batteries due to lithium-ion fires. This issue is of increasing concern due to incorporation of liquid lithium-ion batteries in electric vehicles (EVs). During and immediately after an accident, an EV's liquid lithium-ion battery may be readily ignited when exposed to water in the air, thus posing a major safety problem. This safety issue is becoming more important to address as electric vehicles become increasingly commercially viable and more widely adopted.

Much of the research and development to address these concerns with liquid lithium-ion batteries has been focused on the development of batteries with liquid-less components. Lithium, in its solid-state has a maximum possible capacity of 3600 mAh/g, or nearly ten times that off $LiC_6$. However, lithium metal is also highly reactive in its solid-state and it plates very unevenly. Even in liquid electrolyte lithium-ion batteries, if plating rates exceed what would normally be considered low critical currents (0.5 m $A/cm^2$), lithium can form dendritic or mossy structures rather than smooth or flat plates. This is many times the reason for electrolyte decomposition, swelling, expansion, and even puncturing of liquid lithium-ion batteries. In legacy versions of solid-state lithium foil anode batteries, this current rate is even smaller (0.1 $mA/cm^2$). Therefore, much like many advances in liquid electrolyte lithium-ion batteries have decreased the potential for dendritic or moss-like formations, advances in prevention of this occurrence are even more important if solid-state lithium-ion anodes were to be produced. A battery having a much larger energy storage capacity would be advantageous if charging and discharging rates were in the same range of what consumers and manufacturers have come to expect from modern liquid lithium-ion batteries.

Some research and development into solid-state lithium battery technology has focused on development of a separator suitable for facilitating a solid-state lithium-ion battery free of liquid-electrolyte. Separators are usually insulators capable of providing an electronic separation between battery anodes and cathodes to prevent internal shorts between each solid-state component. Manufacture of a solid anode and solid cathode requires a battery separator having a structure, chemistry, and composition sufficient to enable incorporation of those other solid-state components (e.g., anodes and cathodes). Some separators developed previously for liquid lithium-ion batteries have included polymer sheets, often constructed of polyethylene and/or polypropylene (PE/PP). These sheets offer varying porosity (e.g., 35%-60% porosity). These polymer sheet separators use filler electrolyte, often times containing lithium salts (e.g. $LiPF_6$) dissolved in organic solvents (e.g. ethyl methyl carbonate or dimethyl carbonate). Thicknesses vary and may be as thin as 15 µm. The developed porous polymer sheet separator are usually still "perfect" insulators, despite these pores, meaning they do not conduct lithium ions or electrons or allow transport of lithium ions or electrons across the separator. Instead, lithium ions travel through the liquid electrolyte which fills the pores of the porous polymer sheet separator. The bulk conductivity of liquid electrolytes in organic solvents is around 10 mS/cm at room temperature. However, when they fill insulating porous polymer sheet separators, the overall lithium conductivity across the separator can drop by as much as 100× to values neighboring 0.1 mS/cm at room temperature. In addition, porous polymer sheet separators suffer from areal shrinkage at temperatures as low as 100 C which runs the risk of internal shorts and thermal runaway if the anode touches the cathode during use. Furthermore, the use of PE/PP separators usually requires an organic solvent in liquid form, meaning they may not be appropriate if a solid form factor is desired, for the reasons discussed above.

Therefore, it is readily apparent that there is a recognized unmet need for improvements to battery separators to allow for a truly solid separator for a solid-state battery which allow for bulk migration pathways of lithium ions. The current disclosure is designed to address this need through various improvements to the components and internal structure, which includes the anode disclosed herein while addressing at least some of the aspects of the problems discussed above.

SUMMARY

Briefly described, in a possibly preferred embodiment, the present disclosure overcomes the above-mentioned disadvantages and meets the recognized need for such a separator by introducing various improvements to the manufacture, construction, and design of batteries to accommodate a solid separator in a solid-state lithium-ion battery. These generally include but are not limited to incorporation of novel and/or newly adapted lithium conductive polymers, solid polymer electrolytes (SPE) composites, and interface coatings, either separately or in combination. By allowing for a solid-state lithium-ion solid separator, these improvements have the potential to increase the energy storage capacity of a lithium-ion battery from its theoretical maximum in liquid electrolyte form to its more energy dense solid form without sacrificing conductivity across the solid separator. Additionally, these improvements, alone and/or in combination, help to decrease the potential for harm, such as fire, resulting from expansion, swelling, or damage to a lithium-ion battery. These improvements, alone and/or in combination, may allow for these benefits without the sacrifice of decreasing charging speed, reducing conductivity, adding bulk or weight, and decreasing power supply to devices.

One aspect of the solid separator for solid-state lithium-ion batteries may be an incorporation of novel lithium conductive polymers. The lithium conductive polymers may be manufactured in a variety of forms, each having corresponding benefits and tradeoffs. These variations in forms may be better understood to be separate distinct embodiments of the lithium conductive polymers or may be used in combination to achieve a balance of advantages and tradeoffs.

In a possibly preferred embodiment, the lithium conductive polymers may comprise polymerized carbonate blocks (i.e., polymers derived through the polymerization of carbonate solvents) rather than polyethylene glycol-based blocks (polyethylene oxides or PEOs). Carbonate solvents have higher polarity and provide higher conductivity for lithium ions. Carbonate solvents also have improved oxidative stability due to the delocalization of free electrons over the carbonyl group. Thus, polymer blocks from carbonate solvents such as vinylene carbonate, ethylene carbonate or propylene carbonate may be preferable to PEO with respect to solid-state lithium-ion separator construction. Additionally, carbonates may further possess a conductivity advantage over PEOs. Due to the increased conductivity, many benefits may be derived in the context of the use, manufacture, and implementation of high voltage cathodes (e.g., cathodes of nickel-manganese-cobalt, nickel-cobalt-aluminum oxides, and/or lithium-cobalt-oxide). Ether-based solvents and polymers derived therefrom (such as PEO) are generally not compatible with high-voltage cathodes and can only be used with lower voltage cathodes (e.g. lithium iron phosphate cathodes). Carbonate derived polymers encourage electron delocalization and have higher oxidative stability, thereby enabling these higher voltage cathode technologies to be deployed, with the appropriate separator technology. One exemplary method of polymerizing such a carbonate solvent is by polymerizing the alkene bond in the solvent via free radical polymerization. Various improvements to the use of these carbonate solvents in polymerized form will become more apparent to one skilled in the art from the following Brief Description of the Drawings, Detailed Description of exemplary embodiments thereof, and Claims when read in light of the accompanying Drawings or Figures, including increases in solubility, chemical structural considerations, increases in lithium conductivity, and inclusion of spacer and ring monomers.

Another aspect of the solid separator for solid-state lithium-ion batteries may be solid polymer electrolytes (SPE) composites. The solid polymer-based separator may contain lithium conductive materials which have electron insulating properties. Those having a low material density may be required to yield cells with high energy density. Generally, the lowest density solid materials manufactured today are polymers having chemical structures (microstructures), which contribute to low-density macrostructures. Therefore, polymers which are capable of conducting lithium may be a suitable material for forming the structure for one such separator of a solid-state cell with high energy density. Lithium conductivity in a polymer may be facilitated or made possible by Li+ coordinating or conductive sites within the structure having high mobility. Such groups may include ethereal oxygens, carbonate oxygens, or silicon-based polymers with similar functionalities such as siloxanes. Other Li+ conductive sites on a polymer may be nitrogen-, phosphorous-, or sulfur-based such as found in polydopamines, polyimides, polyphosphazenes or polysulfonates. Separators having thickness of less than 20 microns may be preferable as they may allow for both free standing structure and stability in humid air. The manufacture of such a structure may also contribute to an easy adoption by the existing battery industry. An existing problem which has prevented adoption of such a separator material in the battery industry may be that polymers with high lithium conductivity generally have short chains, which may prevent them from forming thin, free standing films. The strength modulus of these lithium conductive polymers may be improved by creating composites via mixing with inorganic materials. It may be desirable that these inorganic materials share the lithium conductivity and low-density properties. Such inorganic additives may be lithium aluminum titanium phosphate (LATP, $Li_{1.5}Al_{0.5}Ti_{1.5}(PO_4)_3$), lithium lanthanum zirconium oxide (LLZO, $Li_7La_3Zr_2O_{12}$), LSPSCl ($Li_{9.54}Si_{1.74}P_{1.44}S_{11.7}Cl_{0.3}$), LGPS ($Li_{10}GeP_2S_{12}$), or lithium conductive halides and closo-/nido-borates. Electronic insulating carbon-based additives and clays may also be used. Finally, it may be important that the inorganic additives remain as a small fraction of the composite, such as at less than 10% of total separator by weight, volume, and/or mass.

In certain various potentially preferred embodiments of this aspect, various manufacturing techniques and standards may be important to manufacture of both a solid separator and a solid-state lithium-ion battery. These may include electrospinning of the conductive polymer and SPE and/or blade casting the conductive polymer and SPE. Those skilled in the art may understand that certain polymers, certain SPEs, and certain combinations of the same may require one, the other, or a combination of these techniques. Various improvements to the inclusion of SPEs with conductive polymers will become more apparent to one skilled in the art from the following Brief Description of the Drawings, Detailed Description of exemplary embodiments thereof, and Claims when read in light of the accompanying Drawings or Figures.

In yet another aspect of the solid separator for solid-state lithium-ion batteries, the separator may include one or more interface coatings, since lithium conductivity may be maximized across a thin (<20 micron) solid separator. At this thickness, the interface with the anode or cathode may require additional treatment to ensure long term operation. This may be a serious issue for stability, longevity, durability, and safety, especially at the interface with exposed lithium metal anode. Several coatings may stabilize and promote this interface. These include carbon materials and macromolecules such as graphites and graphenes, nitrides, borates, alloys, sulfur-based coatings, fluoroethylene carbonate with a cathode stabilizer additive, the like and/or combinations thereof. Various improvements to the interface coatings will become more apparent to one skilled in the art from the following Brief Description of the Drawings, Detailed Description of exemplary embodiments thereof, and Claims when read in light of the accompanying Drawings or Figures.

Alone, or in combination with features related to solid-state lithium-ion batteries generally, various aspects and features of the solid separator for solid-state lithium-ion batteries over both traditional liquid electrolyte lithium-ion batteries, as well as over existing, available, experimental, and/or proposed solid-state lithium-ion batteries and their respective separators. A benefit of the solid separator for solid-state lithium-ion batteries may be its ability to increase the energy density of batteries above that of currently commercial batteries having liquid cells. Another benefit of the solid separator for solid-state lithium-ion batteries may be its ability to enable high currents of operation above the currently observed 0.1-0.5 mA/cm$^2$ for solid-state batteries and nearing as high as 10 mA/cm$^2$, which may be of significant commercial significance for charging a high energy density battery in less than 30 minutes. Another feature of the solid separator for solid-state lithium-ion batteries may be its ability to enable a safe lithium metal battery structure with lithiophilic interfaces which may result in high cycle life (e.g., greater than 4000 cycles), which may also be of commercial significance for electric vehicles and other durable goods requiring longevity of installed batteries. Another feature of the solid separator for solid-state lithium-ion batteries may be the ability to operate over a much wider temperature range (e.g., −60° C. to 150° C.) than even currently available commercial liquid-based batteries (−30° C. to 60° C.). Another feature of the solid separator for solid-state lithium-ion batteries may be the ability to enable a pre-lithiated anode during manufacture. Another feature of the solid separator for solid-state lithium-ion batteries may be its ability to enable the manufacture of bipolar cells. Bipolar cells utilize bipolar current collectors, which have an anode on one side and a cathode on the other. This may otherwise not be possible, and it is not known to be possible with liquid containing separators because the liquid flows between stacks and creates ionic shorts as well as decomposes the electrolyte. A solid separator which does not contain liquid enables bipolar cells which is one factor which may enable higher rates of charging due to lower internal resistances across the bipolar cell. A bipolar cell may also be safer for a number of reasons, including because it operates with less cell joule heating. Another feature of the solid separator for solid-state lithium-ion batteries may be, in certain embodiments, polymer/inorganic composites which may contain fire retardants which are not flammable and are safer than liquid containing separators. Another feature of the solid separator for solid-state lithium-ion batteries may be enabling other elements of the battery to be solid-state lithium ion (e.g., solid anode, solid cathode). Finally, various other feature of the solid separator for solid-state lithium-ion batteries may include the additional potential benefits of, by way of example and not limitation, low density and lightweight materials, high energy density, the ability to manufacture in sheets having large surface areas, the ability to manufacture in untreated atmospheric air, high electrochemical stability, solvation of high ratios of lithium per weight or molar ratio, high stability of lithium at interface with anode/cathode, high strength, the like and/or combinations thereof.

These and other features of the solid separator for solid-state lithium-ion batteries will become more apparent to one skilled in the art from the prior Summary and following Brief Description of the Drawings, Detailed Description of exemplary embodiments thereof, and Claims when read in light of the accompanying Drawings or Figures.

BRIEF DESCRIPTION OF THE DRAWINGS

The solid separator for solid-state lithium-ion batteries will be better understood by reading the Detailed Description with reference to the accompanying drawings, which are not necessarily drawn to scale, and in which like reference numerals denote similar structure and refer to like elements throughout, and in which.

Figure 1:
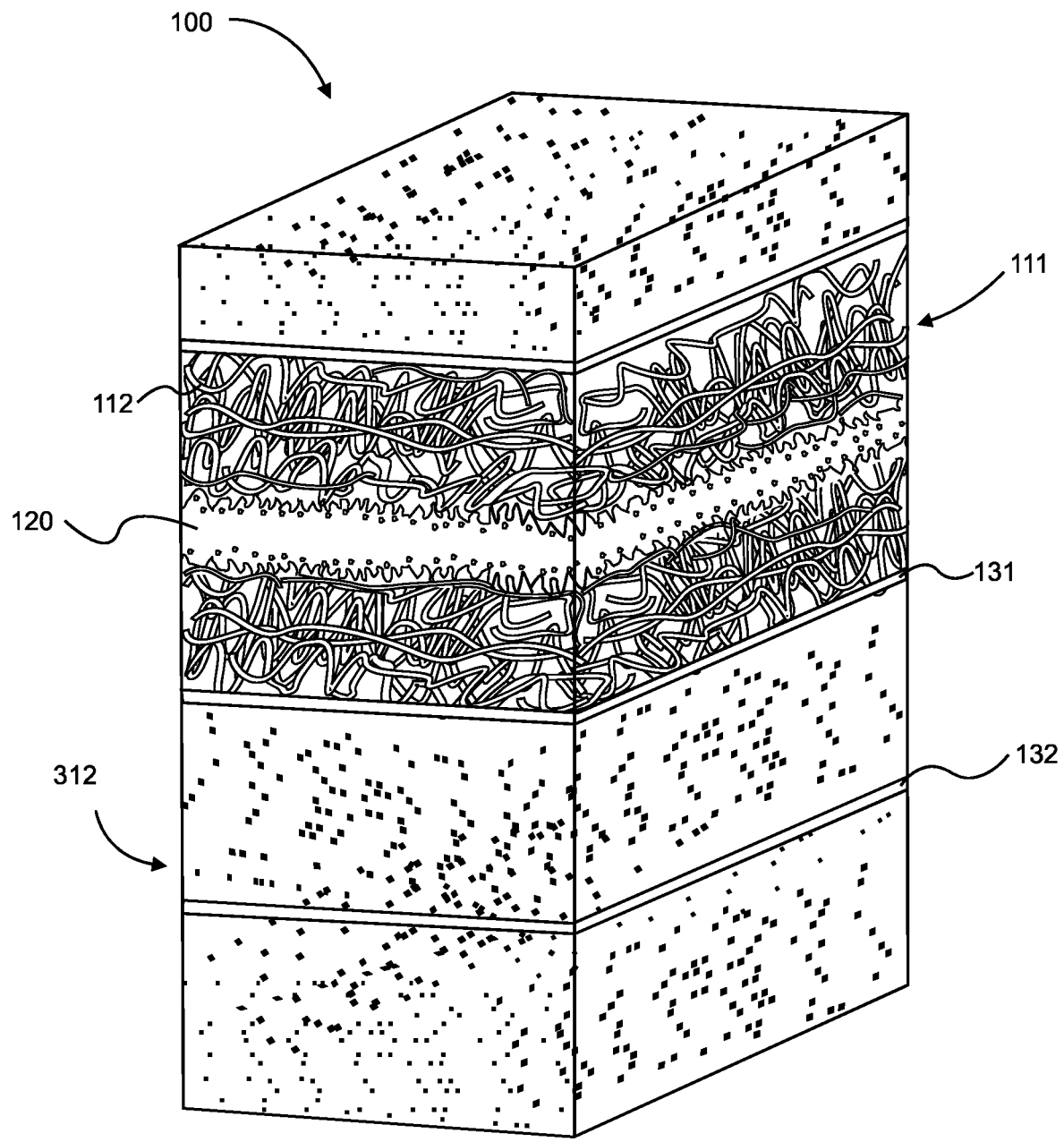
FIG. 1 is a perspective view of a section of an exemplary embodiment of a high energy density lithium metal based battery for solid-state lithium-ion battery of the disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

In describing the exemplary embodiments of the present solid separator for solid-state lithium-ion batteries, as illustrated in FIGS. 1-5, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples. It should be noted that the terms battery, cell, anode, cathode and separator, in their singular and plural form, are used as they relate to the high energy density lithium metal based anode for solid-state lithium-ion batteries of the disclosure, as well as used to describe other batteries, including but not limited to lithium-ion batteries having a liquid electrolyte. While a single cell of a battery may be herein described, one skilled in the art of battery manufacture will understand that multiple cells may be used in the design, construction, manufacture, and assembly of a battery, and multiple batteries may be arranged and/or installed within a completed manufactured good. While fiber framework and fiber sheet(s) are used consistently throughout this detailed description, they may also be understood as a fibrous battery skeleton and separator micro-structure, respectively.

Referring now to FIGS. 1-5 by way of example, and not limitation, therein are illustrated example embodiments of solid separator 131 for solid-state lithium-ion batteries in addition to high energy density lithium solid-state anode 111 for solid-state battery 100. Solid-state battery 100, liquid electrolyte battery 200, and battery 300 may be referred herein as just the battery. Solid separator 131 for solid-state lithium-ion batteries and porous separator 231 may be referred herein as just the separator. High energy density lithium metal based solid-state anode 111, liquid electrolyte anode 211, and anode 311 may be referred herein as just the anode. While variations in construction, design, composition, chemistry, and assembly may be relevant to cathode 312, for the sake of clarity and consistency across FIGS. 1-5, any reference to cathode 312 is simply the cathode, and other relevant features may be referred to in a description as it relates to solid-state battery 100, liquid electrolyte battery 200, and battery 300. Solid-state battery 100, liquid electrolyte battery 200, and battery 300 may be charged via charger 351 and may discharge into powered device 352. As described herein, solid-state battery 100, liquid electrolyte battery 200, and battery 300 may each have a single cell or may have multiple cells connected and/or assembled in multiple layers of anode 311, cathode 312, and separator 331. Lithium, lithium metal, elemental lithium, and lithium-ions may be referred to interchangeably herein, and the disclosure is not so limited to a battery having lithium metal as its electrical flow element. Other elements may include but are not limited to zinc, sodium, cobalt, nickel, lead, potassium, other metals, salts thereof, the like and/or combinations thereof.

In one possibly preferred exemplary embodiment, solid-state battery 100 may include the following components: solid-state anode 111 having solid electrolyte 112 with fiber framework and shown with metal ion deposit 120, solid separator 131, and cathode 312 having solid-state cathode current collector 132. In an embodiment of liquid electrolyte battery 200, liquid electrolyte battery 200 may include the following components: liquid electrolyte anode 211 having graphite anode active material 212 and anode current collector 233, porous separator 231, and cathode 312 having liquid electrolyte cathode current collector 232. In an embodiment of battery 300, battery 300 may include the following components and connections: anode 311, cathode 312, separator 331, charger 351, and powered device 352.

Referring now more specifically to FIG. 1, illustrated therein is an example of solid-state battery 100. Starting toward the top is solid-state anode 111 having solid separator 131 both above and beneath solid-state anode 111. Solid-state anode 111 may be formed from one or more layers of solid electrolyte 112, of which each layer of solid electrolyte 112 may be formed from a fiber framework. Generally, solid-state anode 111 may be understood as the negative or reducing electrode that releases electrons to the external circuit (see FIG. 4) and oxidizes during an electrochemical reaction. Cathode 312 may be understood as the positive or oxidizing electrode that acquires electrons from the external circuit (see FIG. 4) and is reduced during the electrochemical reaction. In this possibly preferred embodiment, solid-state anode 111 may be comprised solid electrolyte 112, which can be understood as a framework of interconnected fibers. The framework interconnected fibers therein solid-state anode 111 may have a variety of properties and may be either flexible or rigid. In the case of a ceramic fiber framework, ceramic may be utilized to provide structure, support to solid-state anode 111 and solid-state battery 100, as well as a surface upon which lithium, or other metals, may deposit. Lithium metal at metal ion deposit 120 may provide the electronic conductivity for solid-state battery 100 while the solid ceramic framework/skeleton may provide volumetric support, surface layer for metal ion deposit 120 and lithium-ion conductivity. During charge and discharge of solid-state battery 100, metal ion deposit 120 may grow in size toward solid separator 131 or shrink toward center of solid-state anode 111. One means to combine, manufacture, and/or operably engage metal ion deposit 120 with the fiber framework of solid electrolyte 112 may be through the melt infusion of lithium metal into a treated ceramic framework. Initially, only a smally quantity of lithium metal may be needed to be infused into the pre-cell assembly of solid-state anode 111. In such a case where only a small quantity is infused into the pre-cell assembly of solid-state anode 111, most or even all reversible lithium which gives a cell its capacity may instead come from cathode 312 in the final assembly.

Accordingly, during a first charge and during all subsequent charges of solid-state battery 100, metal ion deposit 120 may be detected or observed to be very small at or approximate the center of solid-state anode 111. During the charging process of solid-state battery 100, metal ion deposit 120 may be detected or observed to grow in size outward toward solid separator 131, even growing to occupy all space within the fiber framework of solid-state anode 111 along solid electrolyte 112. The deposit of lithium and/or other metals may further occur through temporary use of high voltage insertion cathodes such as lithium ferrophosphate (LFP), lithium cobalt oxide (LCO), nickel/manganese/cobalt (NMC), the like and/or combinations thereof varieties of cathodes. The higher surface area of solid electrolyte 112 having a ceramic fiber framework may allow for higher rates of operation (plating/stripping of lithium) of solid-state battery 100 if compared to a flat lithium foil. However, a flat lithium foil may also be used as an initial form of metal ion deposit 120 and may also be melt infused along center of solid-state anode 111 within solid electrolyte 112.

From the point of view of energy density, an important requirement for ceramic fiber frameworks of solid electrolyte 112 may be the use of low-density ceramic. A proposed example low-density lightweight ceramic may be $Li_{1+x}Al_xTi_{2-x}P_3O_{12}$ (LATP). In this embodiment of solid-state anode 111 having solid electrolyte 112 comprising ceramic, there may be additional components, methods of manufacture, and further variation that include various benefits and tradeoffs. These may include choice in active material and type of functional material processing. In a potentially preferred embodiment of a ceramic version of solid electrolyte 112, coating materials having qualities which attract particular metals may provide increased benefits to encourage smooth, consistent plating along the internal fiber framework. These may include engineering solid-state anode 111 having solid electrolyte 112 to measure approximately 80-90 µm in total per-layer thickness, approximately 5 cm×5 cm total length and width along solid separator 131, with porosity of internal fiber framework of percentages greater than 70%, having individual and/or average fiber diameters of less than 0.35 µm, having individual and/or average fiber lengths of greater than 1 mm, having a coating thickness of approximately 10 nm, and having coating material comprising oxides, nitrides, polymers, or ceramics. Oxide coating materials for fibers within solid electrolyte 112, by way of example and not limitation, include niobum, $Al_2O_3+ZnO$ (AZO), aluminum, indium, zinc, bismuth, magnesium, silicon, gold, iodine, and sulfur oxides, the like and/or combinations thereof oxides. Nitride coating materials for fibers within solid electrolyte 112, by way of example and not limitation include boron, vanadium nitrides, the like and combinations thereof. Polymer coating materials for fibers within solid electrolyte 112, by way of example and not limitation include succinonitrile (SCN). Ceramic coating materials for fibers within solid electrolyte 112, by way of example and not limitation include closoborates (CB), lithium phosphorus oxynitride (LiPON), the like, and/or combinations thereof. By using one or more coatings to a ceramic fiber structure of solid electrolyte 112, ceramics which may not bind readily to lithium, or other metals, may be encouraged to bind to lithium, thereby acting as an electrolyte upon which solid metals, including lithium-ions, may freely move during charge and discharge.

In a second possibly preferred embodiment of the lithium conductor aspect of solid-state anode 111 for solid-state battery 100, a polymer framework in solid electrolyte 112 be preferred. A polymer framework of solid electrolyte 112 within solid-state anode 111 may offer the added benefit of being flexible, where the previous ceramic fiber framework of solid electrolyte 112 within solid-state anode 111 may be described as rigid. This may offer various benefits and tradeoffs, both at the level of the individual cell or layer of solid-state battery 100, but also offer various tradeoffs and benefits to powered device 352, having there installed solid-state battery 100. Requirements of a polymer framework, and materials therein deposited, of solid-state anode 111 may be (a) having a melting point above the melting point of lithium metal (180C), (b) non-conductivity of lithium-ions, and (c) infusion with lithium conductive material into the structure of solid electrolyte 112, such as other conductive polymers with the corresponding lithium salt (e.g., Lithium bis(trifluoromethanesulfonyl)imide/$LiC_2F_6NO_4S_2$/LiTFSI) or ceramic particles embedded into the polymer and/or upon its surface. In this embodiment of solid-state anode 111 having a polymer framework of solid electrolyte 112, there may be additional components, methods of manufacture, and further variation that include various benefits and tradeoffs. These may include a fiber mat which extends throughout solid-state anode 111 and solid electrolyte 112, which may further include aramids and polyimide frames. Furthermore, while not all coatings for ceramic fiber framework may be applicable to a polymer or polymer fiber framework, and while not all properties and features of a ceramic fiber framework may be directly applicable to a polymer or polymer fiber framework, some may. These may include engineering solid-state anode 111 having solid electrolyte 112 to measure approximately 80-90 µm in total per-layer thickness, approximately 5 cm×5 cm total length and width along solid separator 131, with porosity of internal fiber framework of percentages greater than 70%, having individual and/or average fiber diameters of less than 0.35 µm, having individual and/or average fiber lengths of greater than 1 mm, having a coating thickness of approximately 10 nm, and having coating material comprising oxides, nitrides, polymers, or ceramics. Oxide coating materials for fibers within solid electrolyte 112, by way of example and not limitation, include niobium, $Al_2O_3+ZnO$ (AZO), aluminum, indium, zinc, bismuth, magnesium, silicon, gold, iodine, and sulfur oxides, the like and/or combinations thereof oxides. Nitride coating materials for fibers within solid electrolyte 112, by way of example and not limitation include boron, vanadium nitrides, the like and combinations thereof. Polymer coating materials for fibers within solid electrolyte 112, by way of example and not limitation include succinonitrile (SCN). Ceramic coating materials for fibers within solid electrolyte 112, by way of example and not limitation include closoborates (CB), lithium phosphorus oxynitride (LiPON), the like, and/or combinations thereof. By using one or more coatings to a ceramic fiber structure of solid electrolyte 112, ceramics which may not bind readily to lithium, or other metals, may be encouraged to bind to lithium, thereby acting as an electrolyte upon which solid metals, including lithium-ions, may freely move during charge and discharge.

Included in a potentially preferred embodiment of either a ceramic fiber framework or a polymer fiber framework of solid-state anode 111 and solid electrolyte 112, initial deposits of lithium may be important for several reasons. These may be formed initially at metal ion deposit 120 in a very small, nearly insubstantial amount, but grow in size, weight, and volume, and even may occupy all empty space within solid-state anode 111 and solid electrolyte 112. This may be accomplished through various means, though a potentially preferred process to initially deposit metal near the center of solid-state anode 111 on the surface of solid electrolyte 112, and its fibers, may be through the melt infusion of lithium foil.

Additionally, the manufacture of the fibers themselves, whether ceramic or polymer, may offer a variety of important improvements to the structure, formation, and overall properties of solid electrolyte 112, solid-state anode 111 and solid-state battery 100. These techniques may have little to no known applications in the battery technology industry, but may have significant applications in the materials sciences and non-woven material industry. One such process may include sol-gel processes, which may preferably occur prior to deposit of metal ion deposit 120. In this chemical procedure, a "sol" (a colloidal solution) can be formed that then gradually evolves towards the formation of a gel-like diphasic system containing both a liquid phase and solid phase whose morphologies range from discrete particles to continuous polymer networks. In the case of the colloid, the volume fraction of particles may be so low that a significant amount of fluid may be required to be removed initially for the gel-like properties to be recognized. One such means of fluid removal may be to simply allow time for sedimentation to occur, and then pour off the remaining liquid. Centrifugation can also be used to accelerate the process of phase separation. Removal of the remaining liquid (solvent) phase requires a drying process and may result in a significant amount of shrinkage and densification. The rate at which the solvent can be removed is ultimately determined by the distribution of porosity in the gel. The ultimate microstructure of the final component can be strongly influenced by changes imposed upon the structural template during this phase of processing. A thermal treatment, or firing process, is often necessary in order to favor further polycondensation and enhance mechanical properties and structural stability via final sintering, densification, and grain growth. One of the distinct advantages of using this methodology as opposed to the more traditional processing techniques is that densification is often achieved at a much lower temperature. The precursor sol can be either deposited on a substrate to form a film (e.g., by dip-coating, spin coating, or electrospinning), cast into a suitable container with the desired shape (e.g., to obtain monolithic ceramics, glasses, fibers, membranes, aerogels), or used to synthesize powders (e.g., microspheres, nanospheres). This technique, in combination with electrospinning, is known to create a paper-like material having open cavities which may be highly suitable for the depositing of metals, namely lithium ions. Additional processes which may further enhance this space-filling and open cavity feature of solid electrolyte 112, using various compositions of the disclosed ceramics and polymers, may include co-precipitation, evaporation and self-assembly, and utilization of nano-particles.

In either a ceramic or polymer embodiment of solid electrolyte 112, the material by which the fibrous structure having open cavities, the fibrous structure having a lithiophilic coating, may be considered an active material, of which comprises solid-state anode 111. In other words, the active material of solid-state anode 111 may be solid electrolyte 112, which is the active material through which lithium-ions migrate, congregating at metal ion deposit 120. Whichever active material is manufactured in order to create solid-state anode 111 can be processed into a functional material having these properties and acting as solid electrolyte 112 of solid-state battery 100. A first stage in this process may be synthesis of a fiber mat including substances such as LATP, closoborates, and sulfide ceramics. Stages in the sol-gel, or other processes to form the open cavity structure of solid electrolyte 112, may be improved through lower the firing temperature required by implementation of aliovalent substitutions. Other improvements may include maximize density by using flux additives (e.g., $Li_2O$, MgO, ZnO, $Li_3PO_4$, $Li_3BO_3$, $B_2O_3$, $LiBO_2$, $Al_2O_3$, Ta, Nb, Y, Al, Si, Mg, Ca, YSZ, NiO, $Fe_2O_3$, the like, and/or combinations thereof). In order to achieve functional material processing of solid electrolyte 112, the active material of a pre-assembly solid electrolyte 112 may be required to obtain a rugged functional laminate, sheets or mats for use as solid-state anode 111. Slurry additives may be added in order to process a green laminate during the process of rapid sintering. These slurry additives may include, but are not limited to resins, oils, and dispersants (e.g., PAA, glucose, PVP, ethylene glycol, oleic acid, ultrasonic horn, the like and/or combinations thereof). Sintering of the green material using traditional techniques known to those skilled in the art can be a long process (>10 hours) and may need to occur at high temperatures (>1250° C.). These traditional requirements may require high costs of operation, difficulty in scaling up as well, and an undesired loss of lithium by evaporation during sintering. The loss of lithium at these times and temperatures may need to be counter measured by using extra lithium salts during synthesis, which only further increases cost. Instead, methods to allow for scalable application in open atmosphere and prevent the loss or consumption of lithium should be substituted. The resulting sintered green laminate should contain voids for lithium metal melt infusion, subsequent to sintering, which can then occur at room temperature. Voids can instead be built in by using sacrificial plastic/carbon beads or by electrospinning the into fiber mats, as described above. The resulting solid electrolyte 112 may then be suitable for deposit of lithium along metal ion deposit 120.

Alternative measures to encourage these properties in solid electrolyte 112, thereby creating an optimal solid-state anode 111, may include buy are not limited to reactive sintering of starting materials, sintering within an electric field, microwave sinter, SPS or spark plasma, cold sintering using solvent evaporation and salts CSP, and flash sintering using high currents. Alternatively, or in combination with these techniques of the development of solid electrolyte 112, porous sheets may be manufactured using sacrificial beads which are various plastics or carbons with low vaporization temperatures that can be removed and/or destroyed leaving openings in the fiber mat, or the development of a ceramic fiber mat through electrospinning. Other contemplated means which specifically apply to polymer fiber versions of solid electrolyte 112 include the use of polymers having melting points of lithium metal (180C). These polymers, however, typically do not conduct lithium-ions so they, would serve a structural role upon which additional lithium conductive material may be infused into the structure such as other conductive polymers (with the corresponding lithium salt such as LiTFSI) or ceramic particles. For instance, by way of example and not limitation, fiber mat comprising polyimide (having melting point of 450° C.) may be used to infuse with melted lithium and serve as a coating. Further examples include aramids, polyimide frames. Yet another example of providing a suitable formation for solid electrolyte 112 may be a hybrid composite structure having both polymer fiber and ceramic fiber properties. A hybrid composite fiber mat could include fumed silica and G4/LiTFSA with boron/vanadium (or other nitrides) doping upon the surface.

Further important to the surface structure and composition of solid electrolyte 112 may be coating alternatives which may offer, either alone or in combination, additional benefits to the deposit, motility, and smooth plating of metal ion deposit 120. These may include CVD/PVD/PECVD and/or ALD vapor deposition in combination with AZO coating, use of $I_2$, $Li_3N$, $Li_3PO_4$, LLZO, $Li_9AlSiO_8$, $Li_3OCl$, $LiI{:}_4 CH_3OH$, or use of metals which alloy well with lithium, including but not limited to aluminum, indium, zinc, magnesium, silicon, and/or gold. Solution coating may also be used upon, or form a critical component of, solid electrolyte 112, which may be developed using a sulfur-based solution coating method with solutions of, for example, polysulfides, dissolved sulfur ZnO doped argyrodite $Li_6PS_5Br$, $Li_2S_3$ or $Li_3S_4$ dissolved in DEGDME. Polymer coatings may additionally be employed as a surface coating to solid electrolyte 112, which may include SN/FEC with additives and salts (e.g., $CsPF_6$, CsTFSI, $LiNO_3$, LiF, $CuF_2$), elastomers such as SHP, and even glues such as polydopamine and/or polysiloxanes. These various coatings to solid electrolyte 112 may offer various benefits, including reduction in dendritic growth of lithium during plating at metal ion deposit 120 and on solid electrolyte 112, extending possible range of choices for solid electrolyte 112 composition for various applications, and prevention reaction between various highly useful materials for construction of solid-state anode 111 and lithium, or other, metals.

Alternatively, it is contemplated herein that metal ion deposit 120 may be replaced by an anode current collector placed therein solid-state anode 111 within solid electrolyte 112. These may include foils or coatings upon which metals, specifically lithium, may be deposited. Exemplary materials for an anode current collector placed therein solid-state anode 111 within solid electrolyte 112 may include but are not limited to vanadium nitride, lithium-aluminum alloy(s), liquid metals including gallium, indium, and tin, the like, and/or combinations thereof.

Figure 2:
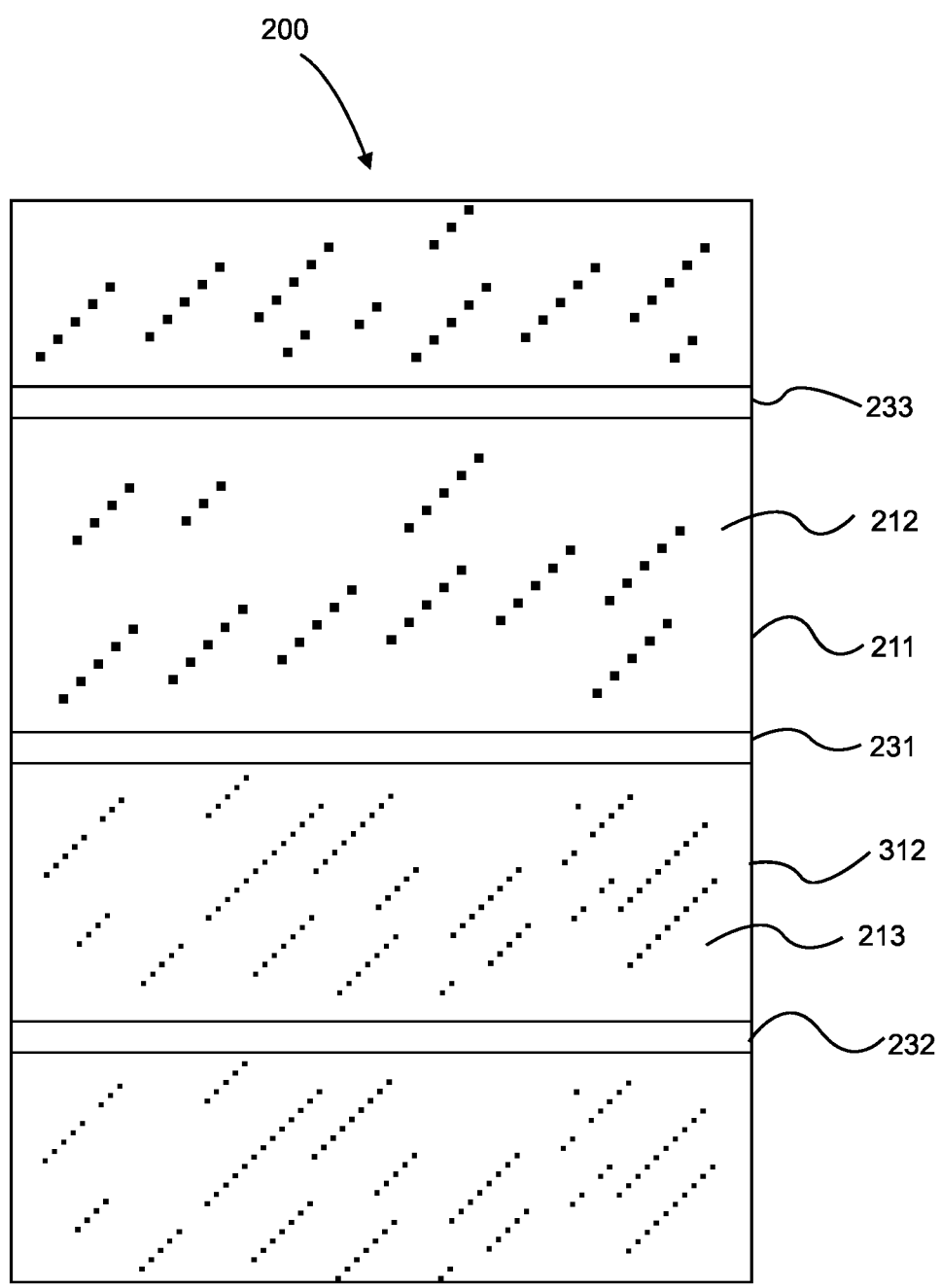
FIG. 2 is a diagram of components of a prior art battery.

Referring now specifically to FIG. 2, illustrated therein is an example of a sectional view of a cell of liquid electrolyte battery 200. Generally, a traditional lithium-ion battery, as liquid electrolyte battery 200 may include liquid electrolyte anode 211 having graphite anode active material 212 and anode current collector 233, porous separator 231, and cathode 312 having liquid electrolyte cathode current collector 232. Known variations of lithium-ion batteries having liquid electrolytes may achieve 275 Wh/kg capacities and feature the ability to recharge, but have the serious shortcomings covered in the Background section above.

If sufficient open space is achieved while maintaining structure, lithium smooth plating, as well as other considerations herein described, solid-state battery 100 may achieve substantially higher capacities while allowing for additional benefits such as durability, safety, quick charging, as well as other above-mentioned benefits. For instance, the 275 Wh/kg capacity of liquid electrolyte battery 200 can be compared to solid-state battery 100 of the disclosure, which has in various forms and combinations, achieved upwards of 635 Wh/kg.

Figure 3:
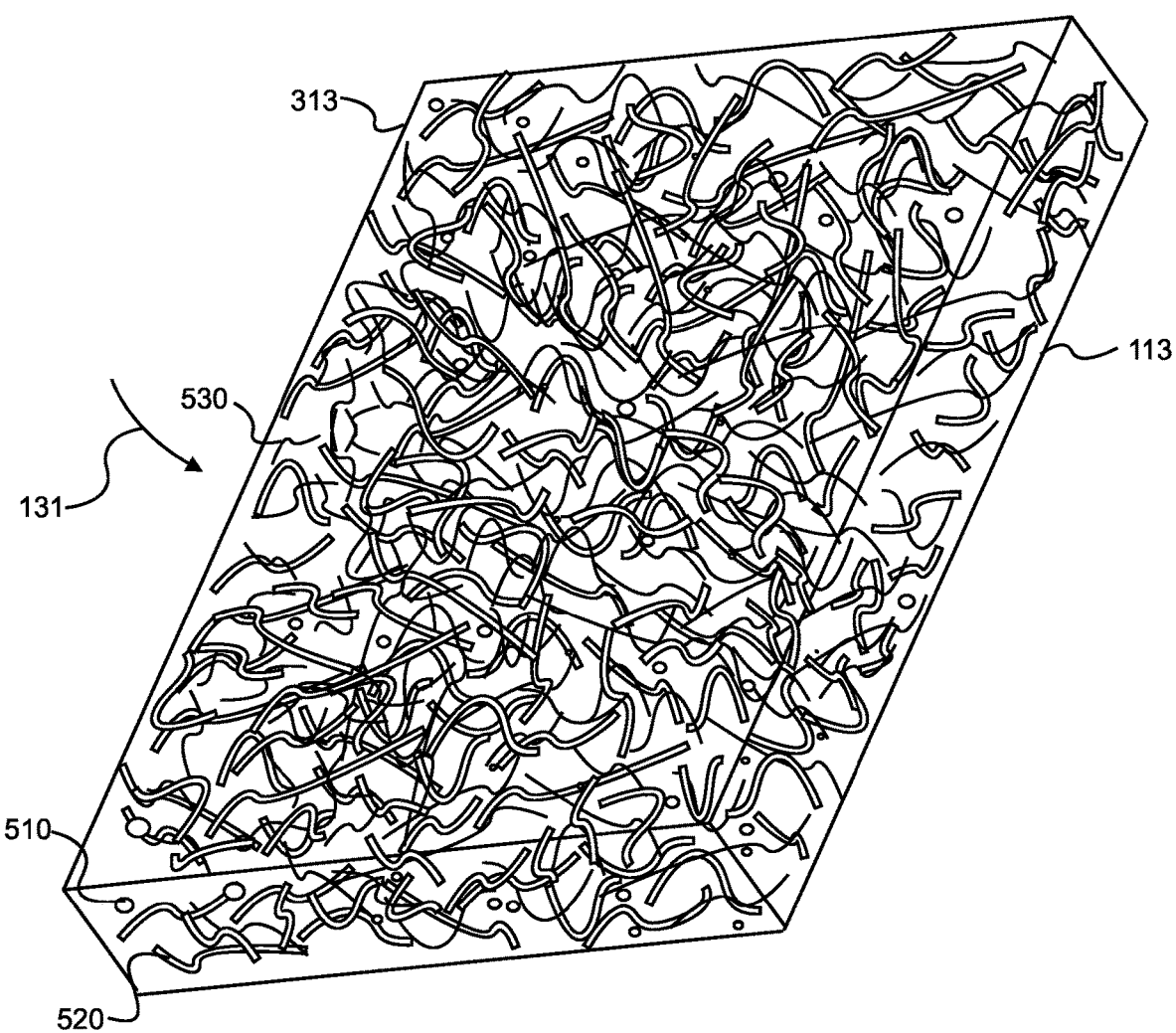
FIG. 3 is a perspective view of a section of an exemplary embodiment of the solid separator for solid-state lithium-ion batteries.

Having thus described a variety of exemplary and suitable solid-state anode for a solid-state lithium-ion battery, referring now specifically to FIG. 3, illustrated therein is a perspective view of a section of an exemplary embodiment of solid separator 131 for solid-state lithium-ion batteries. Broadly described, solid separator 131 for solid state lithium-ion batteries may be formed in one or more sheets, each sheet having a microscopic structure featuring the various improvements and features described herein. These may include, but are not limited to main polymer 520 (illustrated as the thicker of the two groups of long fibers throughout solid separator 131), structural polymer 530 (illustrated as the thinner of the two groups of long fibers throughout solid separator 131), and reinforcing additive 510 (illustrated as a group of circles throughout solid separator 131). It should be understood that, while each side of solid separator 131 may have unique or distinct features, qualities, chemical compositions, the like, and/or combinations thereof, top side 313 and bottom side 113 may be thought of as having indistinct characteristics for the purposes of this disclosure. That being said, should top side 313 operably engage with cathode 312, bottom side 113 would operably engage with anode 311 (or liquid electrolyte anode 211). That is not to say that bottom side 113 could operably engage with cathode 312, or that top side 313 with anode 311, but simply that an anode would reside opposite solid separator 131 the cathode. While not drawn to scale nor drawn to explicitly portray the microscopic appearance or structure of solid separator 131, FIG. 3 portrays an exemplary illustration in order to further demonstrate the purpose, structure, and formation of solid separator 131. Furthermore, those skilled in the art will appreciate the cross-sectional nature of the illustration of FIG. 3 and understand it may represent a small fraction of the material which may be required for even a single-cell solid-state lithium-ion battery. The thickness of solid separator 131 may be understood to be generally uniform, but at a microscopic level, gradations of thickness may be apparent. Solid separator 131 may be understood to be very thin, having a high surface area, and low density. Other objective qualities of solid separator 131 are understood and described herein.

Turning now to the basic structural and chemical constituent composition of solid separator 131, as illustrated in FIG. 3, main polymer 520, structural polymer 530, and reinforcing additive 510 are herein described.

Main polymer 520, as illustrated in FIG. 3, may be duplicated across length, width, and depth of solid separator 131 and may be understood to be generally and/or evenly distributed throughout solid separator 131. As explained above, traditional lithium conductive polymer electrolytes may be polyethylene oxide (PEO) based. This family of electrolytes requires temperatures above 45° C. to provide conductivities above 0.1 mS/cm, typically around 60° C. A wider range of temperatures offering similar conductivities is necessary for adequate industry adoption. PEO is the polymerized version of ether solvents which are known to conduct lithium ions. Ether solvents are not used in liquid cells because their low polarity results in low conductivity for lithium-ions. In other words, PEO polymers inherit the drawback of their monomer constituents. However, carbonate solvents have a higher polarity than ether solvents and generally provide higher conductivity for lithium ions. Carbonate solvents also have improved oxidative stability due to the delocalization of free electrons over the carbonyl group. It is thus desirable to employ polymers from carbonate solvent monomers in main polymer 520 to enable solid separator to conduct lithium ions while improving oxidative stability. Vinylene carbonate, ethylene carbonate or propylene carbonate each provide suitable monomers for a respective polymer, as do combinations of these carbonates as monomers in sequence of a carbonate polymer. Additionally, due to the property allowing for delocalization of electrons, an exemplary solid separator 131 comprising polymers derived from carbonates can offer the additional benefit of increasing the allowable voltage of cathode 312, than may not otherwise be possible with PEO based separators. Carbonates may be polymerized through a variety of chemical reactions, such as the exemplary chemical reaction of polymerizing the alkene bond in the solvent via free radical polymerization.

Certain various exemplary polymers for main polymer 520 are herein described, each of which may be used in solid separator 131, either alone or in combination. Important to each candidate polymer for main polymer 520 is the concept of a spacer monomer. Vinylene carbonate (VC) has the highest conductivity for lithium ions, and is therefore an important candidate block material for main polymer 520. However, due to its ring structure it is highly rigid when polymerized, making the lithium conductivity of a resulting vinylene carbonate polymer very low. To increase its chain mobility and ultimately its lithium-ion conductivity, a (series of) "spacer" linear monomers may be inserted in between the bulky VC ring monomers. Such "spacer" linear monomers may be diol acrylates (e.g., butane diol and hexane diol) or glycol acrylates (e.g., triacrylates, diacrylates and monoacrylates). Since solubility of combinations of these molecules in solution may be challenging, solubility of these materials may be improved by a small mole ratio of highly polar epoxy oxirane (e.g., glycidyl acrylate). Oxiranes can be polymerized with low boiling point amines post assembly, in untreated atmospheric air, to increase the separator strength. Removal of excess unpolymerized initiators or polymerization reactants such as azobisisobutyronitrile (AIBN) or amines may be important to maximize cycle life and improve battery operation. Left unremoved, these highly reactive materials may accelerate battery deterioration. It is thus important that a polymerization mechanism is used to strengthen the separator with low boiling point reactants such that any excess can be evaporated easily during drying steps. In summary, this polymer candidate, in its basic trimer constituent, may be understood as spacer+VC+oxirane.

Other such polymer candidates for main polymer 520 may be understood, in their basic trimer constituents as: spacer+ prop-1-ene1,3-sultone (PES)+oxirane, spacer+4-vinyl-1,3-dioxolan-2-one+oxirane, spacer+allyl methyl carbonate+ oxirane, and polyacrylonitrile (PAN)+succinonitrile (SCN). Specifically, succinonitrile (SCN) may be an important additive to main polymer 520 due to its properties as a highly conductive wax for lithium ions in its polymer state. SCN may be added in various ratios to the solid separator 131 to improve its conductivity as needed. For example, the low conductivity of PAN may be enhanced by a small ratio of SCN.

Structural polymer 530, as illustrated in FIG. 3, may be duplicated across length, width, and depth of solid separator 131 and may be understood to be generally and/or evenly distributed throughout solid separator 131. Properties perhaps most important or even critical to solid separator 131 are (i) lithium conductivity and (ii) electron insulation. An additional property which may be thought of as beneficial, though not critical, may be a low material density which may be required to yield cells with high energy density. As stated above, the lowest density solid materials are polymers, making lithium conductive polymers an excellent candidate for solid separator 131 in order to provide both a backbone of a solid-state cell and lend it the property of high energy density. Lithium conductivity in a polymer is given by Li+ coordinating sites which have high mobility. Such groups may include ethereal oxygens, carbonate oxygens or silicon-based polymers with similar functionalities such as siloxanes. Other Li+ conductive sites on a polymer may be nitrogen-, phosphorous-, or sulfur-based such as those found in polydopamines, polyimides, polyphosphazenes, or polysulfonates. Preferably, the overall thickness of solid separator 131 should be less than 20 microns in thickness. Solid separator 131 should also be free standing and stable in humid air. These requirements would, in addition to benefiting the overall utility and functionality of solid separator 131, may facilitate adoption of solid separator 131, and solid-state batteries in general, by battery manufacturers across various markets. Polymers having high lithium conductivity generally have short chains so they may not form thin, free standing films on their own. Their strength modulus may be improved by creating composites via mixing with inorganic materials, such as reinforcing additive 510. It is desirable that, in addition to main polymer 520 and structural polymer 530, these inorganic materials which may comprise reinforcing additive 510 are also lithium conductive and with low density. Such inorganic additives that may comprise reinforcing additive 510 may be LATP, LLZO, LSPSCl, LGPS, lithium conductive halides, closo-/nido-borates, the like and/or combinations thereof. Electronic insulating carbon-based additives may also be used to form reinforcing additive 510. It may be important that, whether inorganic or carbon-based, reinforcing additive 510 remain as a small fraction of the composite while remaining useful for its reinforcing purpose. An exemplary amount for reinforcing additive 510 may be <10%.

The method of combination of main polymer 520, structural polymer 530, and reinforcing additive 510, or any two of those in combination, may be important to influencing the overall utility, structure, function, and use of solid separator 131. An exemplary method of combination of main polymer 520, structural polymer 530, and reinforcing additive 510 may be electrospinning. This may be understood as a method of combining polymers and inorganic materials into composites, or forming polymer/inorganic composites. Furthermore, production of solid separator 131 via electrospinning and/or sintering the inorganic component into the polymer component may be understood to produce a highly porous mat (i.e., a fibrous mat having >90% porosity), which may then be infused with a conductive polymer. Those skilled in the art of non-woven materials manufacturing may appreciate that laboratory-scale electrospinning may commonly be performed through application of high voltages between a metallic syringe needle and a conductive plate. Electrospinning may be a more adaptable fiber spinning technique than traditional melt spinning. Electrospinning can be performed via a room temperature process and can yield randomly aligned fiber mats or well-aligned fiber mats, depending on desired mat structure. The resultant fiber mat produced via this process can then remain exposed to ambient air while remaining non-reactive at room temperature. If the needle electrospinning method is used, hollow-core fibers may even be obtained by using co-axial needles. This approach can even further reduce the weight of solid separator 131. Unfortunately, no known methods of scaling this well-known laboratory procedure currently exist. However, viscoloids can be modified to spin fibers under a voltage via rotating conductive spirals without the use of needles, following the same principle. Using viscoloids, modified to spin fibers under a voltage via rotating conductive spirals without the use of needles may be a scalable process. Exemplary materials which can be electrospun into fibers under these conditions include, but are not limited to, LATP, LLZO (inorganic), PI (polyimide-organic polymer), carbons (organic), aramids (polymers), the like and/or combinations thereof. Utilization of the modified viscoloid technique using these exemplary materials may be important to scalable production of electrospun of main polymer 520, structural polymer 530, and reinforcing additive 510, or any two of those in combination, to form solid separator 131 in a solid porous mat.

The method of combination of main polymer 520, structural polymer 530, and reinforcing additive 510, or any two of those in combination, may also include blade casting to form solid separator 131. By blade casting polymer, inorganic, and/or lithium salt mixtures, one skilled in the art may form a sturdy, porous, fibrous mat with the lightweight properties described herein, suitable as solid separator 131. Blade casting has the further benefit of being an already scalable process, one which is also already a traditional process known in the battery industry. For instance, virtually all battery electrodes may be assembled by this technique. The blade casting method of this mixture may provide more benefit within solid separator 131 which comprise polymer blends to achieve desired strengths at required thicknesses. However, it may be challenging to obtain large area solid separator 131 having thin (<20 micron) if a majority constituent composition of solid separator 131 is polymer composition, if said polymer composition is also free standing. This method may instead be more suitable for a complete layering cell assembly procedure where solid separator 131 is layered on top of electrodes in a top-to-bottom full inhouse multi-cell battery assembly. In this case, since assembly can occur concurrently with manufacture of solid separator 131, there is no need for the free-standing requirement described above. Some materials which can be used as components for a blade cast slurry to manufacture solid separator 131 include but are not limited to: fumed silica (inorganic additive)+G4 (tetraglyme, solvent) and/or LiTFSA (Li salt), LiBOB, LiTFSI, LiBF2(C2O4), LiBF2

(C2O4), C2O4Li2, CF3CO2Li, C6H5COOLi, other lithium salts, the like, and/or combinations thereof.

In addition to the combination of main polymer 520, structural polymer 530, and reinforcing additive 510, or any two of those in combination, via electrospinning or blade casting, to form solid separator 131, it may be further important to provide interface coatings (or interfacing coatings) at an interface with anode 311 or cathode 312 to make possible and/or improve solid-state battery 100. Since it may be desirable to maximize lithium conductivity across a thin (<20 micron) solid separator 131, additional treatment to top side 313 and/or bottom side 113 of solid separator 131 may be required in order to enable anode 311 and cathode 312 to reside at such close proximity, even in the presence of solid separator 131. In other words, the interface between anode 311 and/or cathode 312 and solid separator 131 may require additional treatment to ensure long term operation, durability, and sustainability of solid-state battery 100. This may be a serious issue especially at the interface with exposed lithium metal of solid-state anode 111. Interface coatings may generally be applied, formed, or otherwise reside at top side 313 and/or bottom side 113. Exemplary coatings which may stabilize and promote this interface include but are not limited to graphites/graphenes (i.e., carbons), nitrides/borates (e.g., boron nitrides, $MgB_2$, $Cu_3N$), metal alloys (e.g., Al coating from $AlX_3$ or $Al(NO_3)_3$ salts dissolved in solutions, In coating from $In(TFSI)_3$, $InF_3$, $In(NO_3)_3$ or salts dissolved in solutions thereof), Sulfur (e.g., $Li_2S+S$, LPS), or FEC (i.e., fluoroethylene carbonate, a cathode stabilizer additive).

Figure 4:
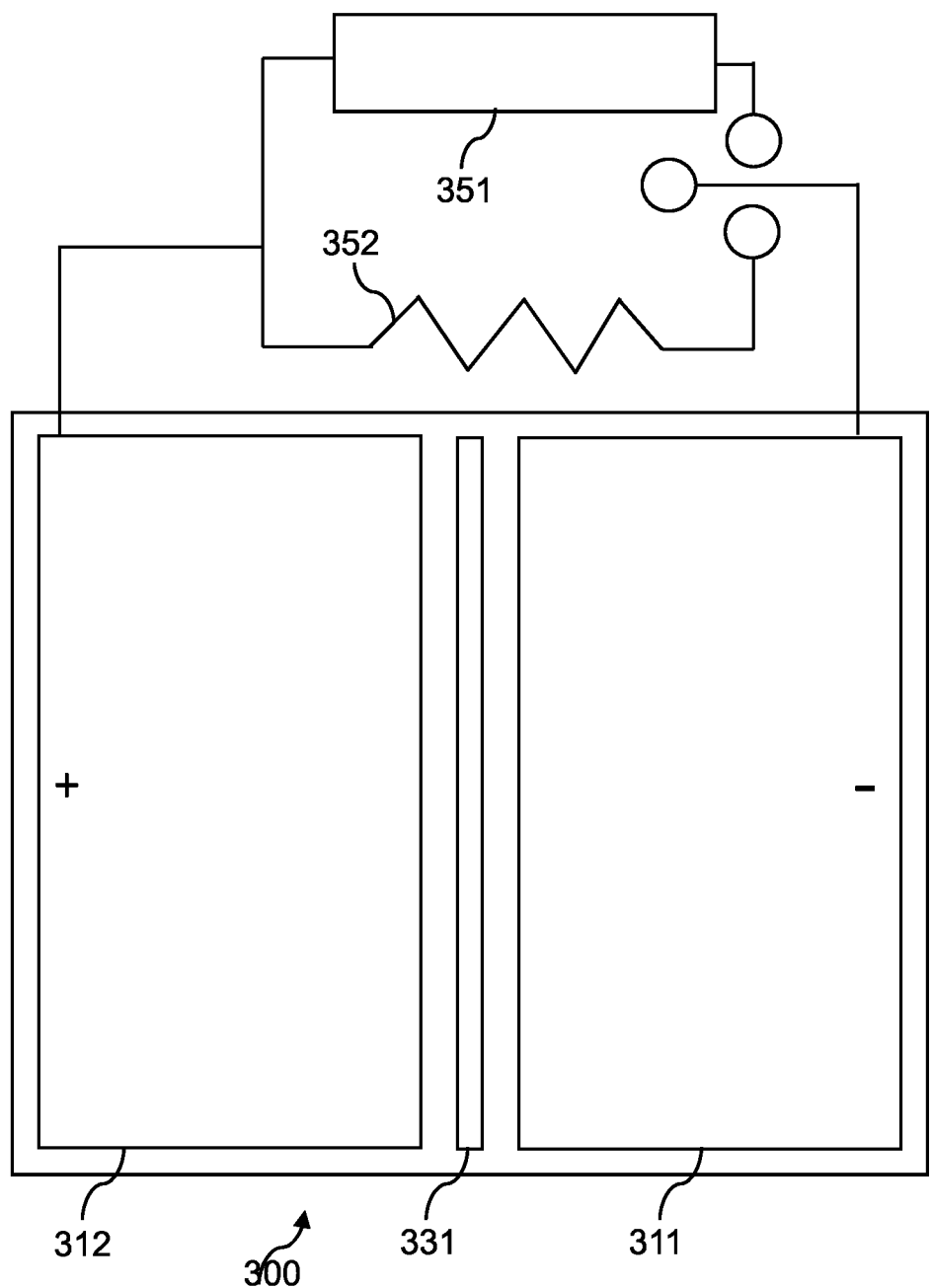
FIG. 4 is a block drawing of a battery.

Turning now specifically to FIG. 4, illustrated therein is a simple block diagram for battery 300 having anode 311, cathode 312, separator 331, charger 351, and powered device 352. When cathode 312 is in conductive contact with charger 351, a circuit is formed with anode 311, thereby charging battery 300. Alternatively, when cathode 312 is in conductive contact with powered device 352, a circuit is formed with anode 311 and powered device 352 is powered. Each of charging and powering occur through any form of known electrochemical processes between anode 311 and cathode 312. In addition to various features, components, methods of manufacture, and improvements to solid-state anode 111 of solid-state battery 100 as herein described, the parts and features of battery 300 may be required to fully manufacture and use solid-state battery 100. Furthermore, various improvements to the parts of battery 300, as known and developed in the art of battery manufacture, including solid-state battery 100 manufacture, may further increase the benefits as herein described of solid-state anode 111. A mere substitution of solid-state anode 111 for anode 311 may not suffice, and one skilled in the art of battery design and manufacture may implement and adapt the features of solid-state anode 111 into battery 300 so as to fully take advantage of the disclosure herein.

With respect to the above description then, it is to be realized that the optimum dimensional relationships, to include variations in size, materials, shape, form, position, function and manner of operation, assembly, type of anode/cathode/battery container, type of connection(s), and use, all of which are intended to be encompassed by the present disclosure. It is contemplated herein that the high energy density lithium metal based anode, or solid-state anode 111, for solid-state lithium-ion batteries (solid-state battery 100), solid separator 131, and the various parts and components herein described may include a variety of overall sizes and corresponding sizes for and of various parts, including but not limited to: solid-state anode 111, solid electrolyte 112, metal ion deposit 120, solid separator 131, cathode 312, cathode current collector 132 the like and/or combinations thereof. Indeed, those various parts and components of solid-state battery 100 may vary in size, shape, etc. during the standard operation of solid-state battery 100. The description of the high energy density lithium metal based solid-state anode 111 for solid-state battery 100 in combination with solid separator 131 herein mentions benefits for electric automobiles and other electronic devices, but the invention is not so limited. solid separator 131 for solid-state lithium-ion batteries of the disclosure, as well as batteries manufactured therefrom, may have applications for powering other vehicles, computers, businesses, homes, industrial facilities, consumer and portable electronics, hospitals, factories, warehouses, government facilities, datacenters, emergency backup, aerospace, space travel, robotics, drones, the like and/or combinations thereof. The chemical formulas, metals, atomic and molecular compositions (the "disclosed formulas") provided herein are exemplary only. One skilled in the art would know that variations of the disclosed formulas may offer tradeoffs to the disclosed solid separator 131 for solid-state lithium-ion batteries and may be substituted to accomplish similar advantages to solid separator 131 for solid-state lithium-ion batteries of the disclosure. Furthermore, it is contemplated that due to variations in materials and manufacturing techniques, including but not limited to polymers, alloys, metals, assembly, tabbing, welding, atmospheric composition, the like and combinations thereof, that a variety of considerations may be considered with regard to battery manufacture. Yet still, though the inventor has contemplated various methods of manufacturing and assembling a battery to accomplish the result(s) of a greater per-mass electric storage capacity (energy density), providing high currents of operation, increasing the durability and longevity of a battery, increasing the range at which a battery may reliably operate, provide a safer battery, and a more efficient means of production, the disclosure is not limited to the specific components, the benefits herein recited and described, and/or the methods of manufacture recited herein.

The foregoing description and drawings comprise illustrative embodiments. Having thus described exemplary embodiments, it should be noted by those skilled in the art that the disclosures herein are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A battery, the battery comprising:
    an at least one cathode;
    an at least one anode; and
    an at least one solid separator in contact with said at least one cathode and said at least one anode, the at least one solid separator comprising a Li+ conductive main polymer comprising a plurality of carbonate monomers and an at least one spacer monomer, a structural polymer, and a reinforcing additive that in combination form a Li+ conductive solid fibrous mat;
wherein said plurality of carbonate monomers is an at least one monomer from a group of monomers, the group consisting of a vinylene carbonate, a prop-1-ene1,3-sultone, a 4-vinyl-1,3-dioxolan-2-one, and an allyl methyl carbonate and wherein said Li+ conductive main polymer further comprises an at least one additional monomer from a group of additional monomers, the group consisting of an oxirane, a glycidyl acrylate, a succinonitrile, and a polyacrylonitrile.

2. The battery of claim 1, wherein said at least one solid separator is free standing and non-reactive at room temperature.

3. The battery of claim 1, wherein said structural polymer and said reinforcing additive combine to form a solid polymer electrolyte composite.

4. The battery of claim 1, wherein said reinforcing additive is lithium conductive.

5. The battery of claim 1, wherein said Li+ conductive main polymer includes an at least one lithium ion coordinating site from a group of lithium ion coordinating sites, the group consisting of an ethereal oxygen, a carbonate oxygen, a silicon, a nitrogen, a phosphorous, a sulfur.

6. The battery of claim 1, wherein said Li+ conductive main polymer further comprises an at least one polymer from a group of polymers, the group consisting of a polydopamine, a polyimide, a polyphosphazene, and a polysulfonate.

7. The battery of claim 1, wherein said solid separator is less than 20 microns in thickness.

8. The battery of claim 1, further comprising an interfacing coating therebetween said separator and said at least one cathode.

9. The battery of claim 1, further comprising an interfacing coating therebetween said at least one solid separator and said at least one anode.

10. The battery of claim 1, wherein said battery is a lithium-ion solid-state battery and said at least one anode and said at least one cathode contain no liquid electrolyte.

11. The battery of claim 1, wherein said reinforcing additive is present in an amount not exceeding 10% by weight.

12. The battery of claim 1, wherein said reinforcing additive is an at least one additive from a group of additives, the group consisting of a LATP, a LLZO, a LSPSCI, a LGPS, a lithium-conductive halide, a closo-borate, and a nido-borate.

13. The battery of claim 1, wherein said structural polymer and said reinforcing additive are combined into a fibrous mat via electrospinning.

14. The battery of claim 1, wherein said structural polymer and said reinforcing additive are combined into said Li+ conductive solid fibrous mat via a supporting material, said supporting material manufactured via blade casting.

15. A solid separator for a battery comprising:
a Li+ conductive main polymer comprising an at least one spacer polymer, an at least one carbonate monomer, and an at least one additional monomer from a group of additional monomers, the group consisting of an oxirane, a glycidyl acrylate, a succinonitrile, and a polyacrylonitrile, said at least on spacer polymer is a carbonate monomer;
a structural polymer having an at least one lithium coordinating site; and
a reinforcing additive;
wherein said main polymer, said structural polymer and said inorganic reinforcing additive are formed into a porous fiber mat and coated with a lithium conducting interface on an at least one side, wherein said at least one carbonate monomer is an at least one monomer from a group of monomers, the group consisting of a vinylene carbonate, a prop-1-ene1,3-sultone, a 4-vinyl-1,3-dioxolan-2-one, and an allyl methyl carbonate.

16. A battery comprising:
an at least one anode;
an at least one cathode; and
a solid separator in contact with said at least one of the anode and said at least one cathode, the solid separator comprising a non-woven fibrous mat comprising a plurality of lithium conductive polymers and a plurality of solid polymer electrolyte composites, said plurality of lithium conductive polymers comprise at least a plurality of carbonate monomers selected from a monomer group consisting of a vinylene carbonate, a prop-1-ene1,3-sultone, a 4-vinyl-1,3-dioxolan-2-one, and an allyl methyl carbonate, and an at least one spacer monomer, and wherein said plurality of solid polymer electrolyte composites comprises an at least one additional monomer from a group of additional monomers, the group consisting of an oxirane, a glycidyl acrylate, a succinonitrile, and a polyacrylonitrile.

17. The battery of claim 16, wherein the non-woven fibrous mat is produced via electrospinning or blade casting the lithium conductive polymers and solid polymer electrolyte composites.

* * * * *